Sept. 13, 1960          C. F. ROBINSON          2,952,153
ACOUSTICAL APPARATUS FOR GAS DETECTION
Filed Dec. 12, 1955                    2 Sheets-Sheet 1
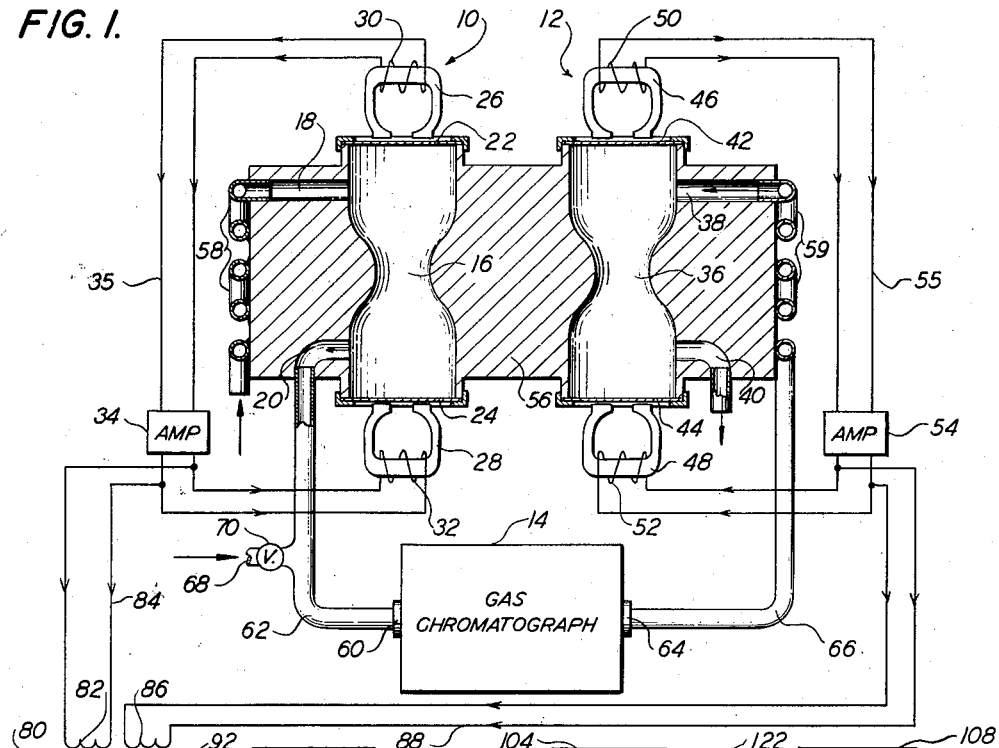
FIG. 1.
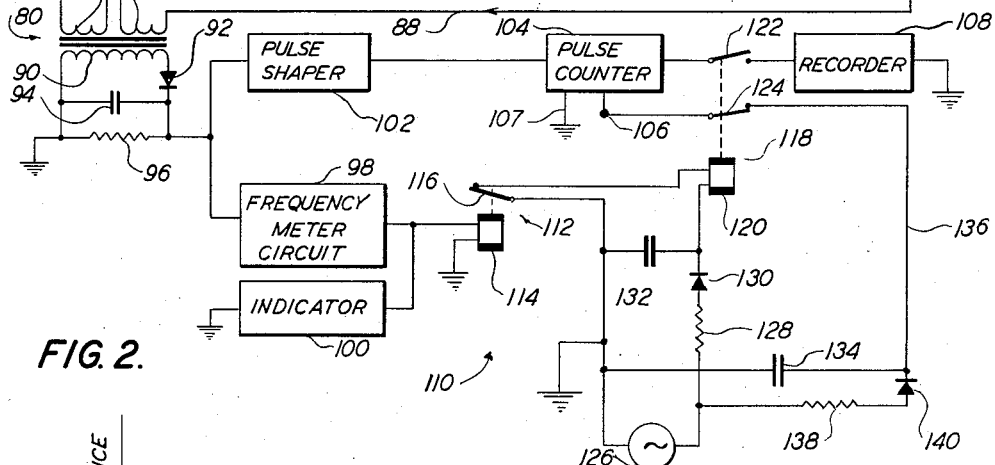
FIG. 2.
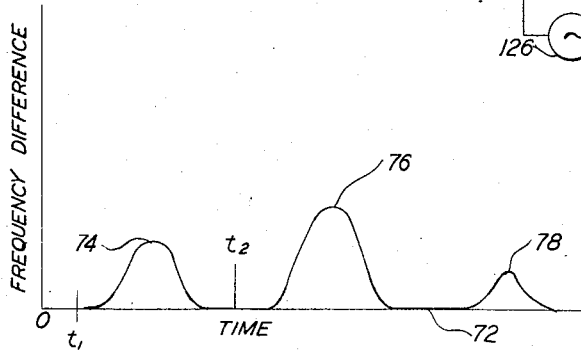
INVENTOR.
CHARLES F. ROBINSON
BY
Christie, Parker & Hale
ATTORNEYS Sept. 13, 1960     C. F. ROBINSON     2,952,153
ACOUSTICAL APPARATUS FOR GAS DETECTION
Filed Dec. 12, 1955     2 Sheets-Sheet 2

INVENTOR.
CHARLES F. ROBINSON
BY
Christie, Parker & Hale
ATTORNEYS

2,952,153

ACOUSTICAL APPARATUS FOR GAS DETECTION

Charles F. Robinson, Pasadena, Calif., assignor, by mesne assignments, to Consolidated Electrodynamics Corporation, Pasadena, Calif., a corporation of California Filed Dec. 12, 1955, Ser. No. 552,357

6 Claims. (Cl. 73—23)

This invention relates to the field of gas analysis, and it has particular reference to methods and apparatus for detecting one or more component gases present in a gas mixture. The apparatus of the invention is especially useful in conjunction with a gas chromatograph, and it also may be used with other gas separating devices.

An illustrative type of gas chromatograph is essentially a column of adsorbent material. The chromatograph is used by introducing a sample of the gas mixture to be analysed to the column, generally in a carrier gas stream which continuously flows through the column. Under proper conditions, various components of the gas mixture sample are spatially separated by the process of selective adsorption and desorption. The separated gas components issue from the end of the column in sequential order corresponding to their relative volatility, molecular weight or other property affecting their respective rates of adsorption and desorption in the column. Conventionally, as the separated gases emerge, they are passed through a suitable detector which in some way measures a property of the gas indicative of the character and amount present. For further explanation of gas chromatography see "Gas-Liquid Partition Chromatography," by A. T. James and A. J. P. Martin in Analyst, vol. 77, p. 915, December 1952.

In current practice, the successive gas components appearing in the effluent from a gas chromatograph are usually detected by their influence on the thermal conductivity of the carrier gas. This method has at least three faults. First, it requires a thermal conductivity bridge that inherently yields a very low output signal which is difficult to transmit. Secondly, the thermal conductivity measurement is non-linear with respect to the weight concentration of one gas component in a mixture, and the amount of non-linearity varies from one gas to another so that it cannot be corrected simply by a non-linear scale. Thirdly, the sensitivity of this measurement varies from gas to gas by large factors and in a way that is very difficult to predict with any appreciable accuracy; the signal output of the thermal conductivity cell may even be of different sign for different gases.

A second detection method involves adsorption of the successive gas components appearing in the effluent on adsorbers such as charcoal and measuring the heats of adsorption with a thermopile. This method is also intrinsically non-linear with a low level output signal. The non-linearity varies from one gas to another and the sensitivity varies by a factor of about four or more from gas to gas.

These difficulties are substantially overcome in the present invention by providing an acoustical method for detecting the gas components. This is accomplished by providing a pair of acoustic resonators each having a hollow core for receiving gas and each producing a frequency output dependent upon the nature of gas present in the core, arranging the resonators so that a gas mixture can be passed through one core and the gas mixture less at least one of its component gases can be passed through the other core, and providing means responsive to the frequency outputs of the two resonators for quantitatively detecting the gas component when said gases are passed through the respective cores.

The resonant frequency of an acoustic resonator is a constant multiple of the velocity of sound in the gas present in the core of the resonator. The resonant frequency may be measured with high precision, and the resulting information is easy to transmit over long distances.

In accordance with the present invention, the frequency difference in the output frequencies of the two resonators is proportional to the weight concentration of the particular gas component in the mixture. This frequency difference is relatively insensitive to change with the kind of component gas under consideration, and the linearity of the frequency difference is also good up to reasonably high concentrations. For example, when used with a gas chromatograph, if the carrier gas is helium and the successive gas components appearing in the effluent are methane, propane, etc., the relative sensitivity changes from about 0.803 for methane to about 0.938 for propane and approaches 1.00 asymptotically as the density of the gas increases. Thus, the change in sensitivity from gas to gas is within about ±10% from molecular weight 16 on up. Also, the frequency difference which is obtained in the two resonators is linear to about ±0.3% with weight concentration in the effluent for all gas components from molecular weight 16 up and within the range $0\% < \beta < 30\%$ where $\beta$ is the weight concentration of the gas component in the effluent gas mixture. If a non-linear scale is used, errors due to variations in non-linearity from one gas to another are within ±1.0% weight in the range $0\% < \beta < 45\%$.

So far we have assumed that the temperatures of the two resonators are equal. Small differences in absolute temperature between the gas in the cores of the two resonators can have an effect of about the same magnitude as the weight concentration of the gas component itself. If only one resonator were used, this would involve a very serious problem of maintaining the gas in the core of the resonator at a substantially constant temperature. However, since a pair of resonators are used, it is only necessary to maintain the gas in both resonators at substantially the same temperature. Preferably this is accomplished by providing a body of heat conducting material which surrounds the core of both resonators, and means for passing the gas entering into each core through circuitous paths intimate with the heat conducting material before the gas enters the cores.

In accordance with a preferred embodiment of the invention, first and second acoustic resonators are adapted for use with a gas chromatograph so that a stream of carrier gas may be passed in series through the core of the first resonator, the chromatograph, and the core of the second resonator. The gas sample to be analyzed is introduced into the stream at a point downstream from the first resonator so that the component gases of the sample are separated in the chromatograph and successively carried through the core of the second resonator together with the carrier gas. An electrical circuit responds to the frequency outputs of the two resonators and produces a beat frequency equal to the difference in output frequencies of the two resonators. A counter is coupled to the electrical circuit for accumulating a count of the cycles of the beat frequency, and a frequency meter is coupled to the electrical circuit for measuring the beat frequency. Relay means responsive to the frequency meter transfer the counter reading from the counter to a recorder each time one of the sample components finishes passing through the core of the second resonator, and resets the counter after each counter reading is so transferred.

The invention is explained in more detail with reference to the drawings in which:

Fig. 1 is a schematic drawing, partially in section, of a preferred embodiment of the invention in use with a gas chromatograph;

Fig. 2 is a graph showing frequency difference as a function of time as it may appear for successive gas components issuing from the gas chromatograph of Fig. 1;

Figure 3:
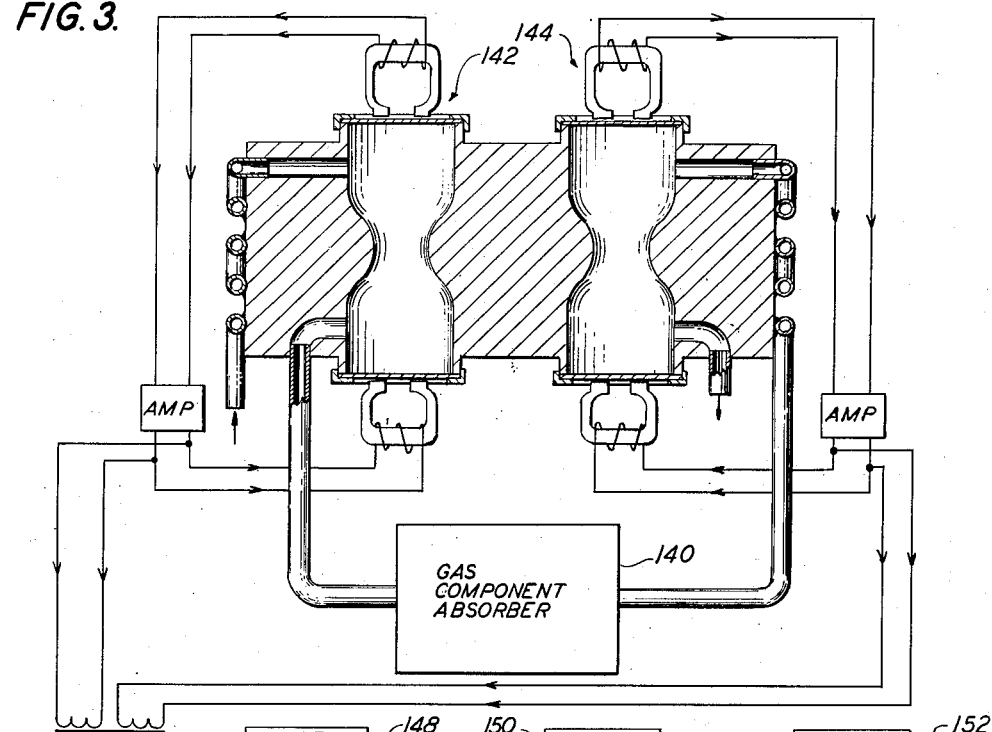
Fig. 3 is a schematic drawing showing the apparatus of Fig. 1 modified to be used with a different type of gas separating device.

Referring now to Fig. 1, a pair of matched acoustic resonators 10, 12 are adapted for use with a gas chromatograph 14. The first acoustic resonator 10 has a hollow core 16, the core having an inlet 18 and an outlet 20 so that gas may be passed through it. A pair of flexible magnetic diaphragms 22, 24 are respectively affixed across opposite ends of the core 16. A pair of permanent magnets 26, 28 are respectively disposed at opposite ends of the core 16 adjacent the diaphragms 22, 24 so that the magnetic fields of the magnets interact with the diaphragms. The first permanent magnet 26 has a coil 30 wound about it, and a similar coil 32 is wound about the second magnet 28. The coils 30, 32 are electrically interconnected through an amplifier 34 by a circuit 35 so that a closed loop system is formed.

Deflection of the diaphragm 22 will cause the magnet 26 to produce a proportional change in magnetic flux which in turn will produce a signal in the coil 30 that is amplified by the amplifier 34 and applied to the coil 32. The signal so produced in the coil 32 will alter the magnetic flux in the neighborhood of the diaphragm 24 and cause the diaphragm to deflect accordingly. Deflection of the diaphragm 24 will in turn cause a sound wave to be transmitted through the core to the diaphragm 22 which will be deflected in accordance with the sound wave, and the entire cycle of events will repeat. Any extraneous noise will set the resonator to operating. The diaphragms 22, 24 will vibrate at a resonant frequency proportional to the velocity of sound through the gas contained in the core, and losses of energy will be compensated by the amplifier 34 so that the sound wave in the core is maintained. The resonator then has a resonant frequency output dependent upon the nature of gas present in its core.

The second resonator 12 is identical in both structure and operation to the first resonator. Accordingly, it includes a hollow core 36 having an inlet 38 and an outlet 40, a pair of diaphragms 42, 44 with corresponding permanent magnets 46, 48, coils 50, 52, and an amplifier 54 through which the coils are electrically connected by a circuit 55.

Each resonator core may have an hour glass shape which obstructs any higher harmonics set up through the core so that only the fundamental harmonic sound wave effectively passes between the diaphragms.

In order to maintain the temperature of the gas in both cores at substantially the same value, both cores are formed integrally from a block of heat conducting material 56, and two circuitous conduits 58 and 59 are each soldered to the block and connected respectively to the inlet of the first and second cores. The heat conducting material may be copper, and it effectively surrounds the cores of both resonators. The two conduits 58, 59 each provide a circuitous path intimate with heat conducting material through which the gas must pass before entering into the associated core.

The outlet of the core of the first resonator is coupled to the inlet 60 of the gas chromatograph by a gas conduit 62. The outlet 64 of the gas chromatograph is coupled to the circuitous conduit 59 and thus to the inlet of the core of the second resonator by a gas conduit 66. Therefore, a carrier gas such as helium may be continuously passed in series through the core of the first resonator, the chromatograph, and the core of the second resonator. The conduit 62 which is coupled to the inlet of the gas chromatograph has a branch 68 with a valve 70 so that a gas sample may be introduced into the stream of carrier gas at a point downstream from the core of the first resonator. This is usually done by injecting the sample in vapor or liquid form through the valve 70 with a hypodermic syringe whereupon the sample, if liquid is vaporized to gaseous form. The component gases present in the sample will then be spatially separated in the gas chromatograph and successively carried through the core of the second resonator by the carrier gas. Thus, in essence, a series of binary gas mixtures all of which have one component (the carrier gas) in common are passed through the core of the second resonator and the carrier gas alone is passed through the core of the first resonator. The gas mixtures are, in this case, the carrier gas plus a component gas of the sample.

It can be shown by fundamental derivation from ideal gas laws that if one arranges a pair of matched acoustical resonators at the same temperature and runs gases through them according to the description above, the frequency difference $\Delta F$ between the two resonators is given to a second order approximation by $$\Delta F = \frac{\beta f}{2}\left(1 - \frac{w_1 \gamma_2}{w_2 \gamma_1}\right) - \frac{\beta^2 f}{4}\left(1 - \frac{w_1 \gamma_2}{w_2 \gamma_1}\right)^2 + \ldots \quad (1)$$

where $w_1$ and $w_2$ are the molecular weights of the carrier gas and sample gas component, $\gamma_1$ and $\gamma_2$ are the ratios of specific heats of the carrier gas and the sample gas component respectively, $\beta$ is the weight concentration of the sample gas component in the carrier gas in the effluent from the chromatograph, and $f$ is the resonant frequency of the first resonator which contains the pure carrier gas.

The value of $\beta$ will ordinarily range between 0% and a maximum of 33%, or 0 to ⅓, so that the second order term of Equation 1 may be neglected. For example, if the carrier gas is helium and the component gases are methane, propane, etc., the non-linearity of $\Delta F$ with respect to $\beta$ caused by neglecting the second order term of Equation 1 is only about $\pm 0.003 \Delta F$ in the range of $0\% < \beta < 33\%$ for components of molecular weight 16 and up. Thus, neglecting the second order term, Equation 1 reduces to $$\Delta F = \frac{\beta f}{2}\left(1 - \frac{w_1 \gamma_2}{w_2 \gamma_1}\right) \quad (2)$$

Both of the terms $$f \text{ and } \frac{w_1 \gamma_2}{w_2 \gamma_1}$$

are substantially constant. This may be shown as follows.

Since $f$ is the frequency output of the first resonator which contains pure carrier gas, $f$ is constant except for the effect of temperature changes. However, in view of the fact that $f$ ordinarily has a large value, say of the order of 20,000 cycles per second, it can be seen from Equation 2 that any small changes produced in $f$ by small variations in the overall temperature of the whole system will have a very small effect on the value of $\Delta F$. Therefore, $f$ can be considered a constant for practical purposes.

The term $$\frac{w_1 \gamma_2}{w_2 \gamma_1}$$

is constant for any given carrier gas and given gas component. Variations in the value of the term $$\frac{w_1 \gamma_2}{w_2 \gamma_1}$$

from one sample gas component to another represents the variation in the sensitivity of the measurement of $\Delta F$ from gas to gas. Using the previous example of helium as the carrier gas and methane, propane, etc. as the sample gas components, the value of the term $$\left(1 - \frac{w_1 \gamma_2}{w_2 \gamma_1}\right)$$

changes from about 0.803 for methane to about 0.938 for propane and approaches 1.00 asymptotically as the density of the gas increases. Thus, using helium as the carrier gas, the change in sensitivity from gas to gas is within about $\pm 10\%$ from molecular weight 16 on up, and the sensitivity is constant for any one gas component. This is a big improvement over the change in sensitivity from gas to gas inherent in the conventional thermal conductivity and heat of adsorption measurements. Thus, we may write $$\frac{f}{2}\left(1 - \frac{w_1 \gamma_2}{w_2 \gamma_1}\right) = K \qquad (3)$$

where $K$ is substantially constant. In view of Equation 3, Equation 2 reduces to $$\Delta F = K\beta \qquad (4)$$

Since $\beta$ has been defined as the weight concentration of the sample gas component in the carrier gas in the effluent from the chromatograph, it may be represented by $$\frac{dM_1}{dt}$$

divided by $$\frac{dM_2}{dt}$$

where $$\frac{dM_1}{dt}$$

is the mass flow rate of the sample gas component through the core of the second resonator, and $$\frac{dM_2}{dt}$$

is the mass flow rate of the carrier gas through the core of the second resonator. Substituting these expressions into Equation 4, we obtain $$\Delta F = K \frac{\frac{dM_1}{dt}}{\frac{dM_2}{dt}} \qquad (5)$$

Since $$\frac{dM_2}{dt}$$

is the mass flow rate of the carrier gas through the core of the second resonator, which rate is substantially constant, we may write $$K_1 = \frac{K}{\frac{dM_2}{dt}} \qquad (6)$$

where $K_1$ is substantially constant. In view of Equation 6, Equation 5 now becomes $$\Delta F = K_1 \frac{dM_1}{dt} \qquad (7)$$

Equation 7 shows that by measuring $\Delta F$, one can determine the mass flow rate of the sample gas component at any time. Also, it can be shown that the time integral of $\Delta F$ will represent the mass $M_1$ of sample component gas which passes through the core of the second resonator in the time interval $t_1 - t_2$. Thus, integrating both sides of Equation 7

$$\int_{t_1}^{t_2} \Delta F \, dt = K_1 \int_{t_1}^{t_2} \frac{dM_1}{dt} dt = K_1 M_1 + K_2 \qquad (8)$$

where $K_2$ is zero in the case under discussion here. $K_1$ is fixed by suitable calibration of any integrating mechanism used to integrate the function $\Delta F$. Therefore, as a practical matter, we can write Equation 8 as $$\int_{t_1}^{t_2} \Delta F \, dt \propto M_1 \qquad (9)$$

Equation 9 shows that in a calibrated instrument for integrating $\Delta F$ over the time interval $t_1 - t_2$, the value of the integration is proportional to the mass $M_1$ of sample component gas which passes through the core of the second resonator during the time interval $t_1 - t_2$. Before, we have assumed that $$\frac{dM_2}{dt}$$

was constant. However, it can be shown that this is not a necessary condition if the time interval $t_1 - t_2$ covers the whole period of time during which the sample gas component is passing thorugh the core of the second resonator.

The frequency difference $\Delta F$ between the resonators may be called a beat frequency. The beat frequency $\Delta F$ may be integrated with respect to time over the time interval $t_1 - t_2$ by counting the number of beats or cycles occurring over the time interval. Thus $$\int_{t_1}^{t_2} \Delta F \, dt = \int_{t_1}^{t_2} \frac{dn}{dt} dt = n \Big]_{t_1}^{t_2} = N \qquad (10)$$

where $n$ is the cumulative number of beats at any instant and where $N$ is the total number of beats occurring during the time interval $t_1 - t_2$. By substituting Equation 10 into Equation 9 we obtain $$N \propto M_1 \qquad (11)$$

Equation 11 may be explained with reference to Fig. 2, where $\Delta F$ is plotted with respect to time. The base line 72 represents $\Delta F$ as seen by a calibrated measuring instrument where pure carrier gas is passing through the cores of both resonators. The three curves 74, 76, 78 represent the variation in $\Delta F$ as successive sample gas components pass through the core of the second resonator. Looking at a particular curve 74, we can assume that it occurs over the time interval $t_1 - t_2$. Thus, Equation 10 says that the total number of cycles or beats of the frequency $\Delta F$ over the time interval $t_1 - t_2$, which is $N$, is equal to the time integral of $\Delta F$ evaluated over the interval $t_1 - t_2$, or in other words is equal to the area under the curve 74. Equation 11 says that $N$, the total cycles representing the area under the curve 74, is proportional to the mass $M_1$ of the particular gas sample component represented by the curve 74.

Referring again to Fig. 1, the remainder of the preferred apparatus is an arrangement responsive to the frequency outputs of the two resonators for providing quantitative gas measurements in accordance with the preceding derivations. A transformer 80 has a first primary winding 82 which is coupled to the circuit 35 of the first resonator by a circuit 84. The transformer has a second primary winding 86 which is coupled by a circuit 88 to the circuit 55 of the second resonator. Therefore, the output frequencies of the first and second resonators will appear in the primary windings 82, 86 respectively. The transformer has a secondary winding 90 to which the respective output frequencies in the windings 82, 86 are both transferred, the output frequencies being combined in the secondary winding 90. A diode 92 is coupled to the secondary winding 90 and it serves to provide half-wave rectification for the combined frequency in the secondary winding 90.

A condenser 94 and an electrical resistor 96 are both connected across the terminals of the secondary winding 90 of the transformer. The time constant of the combination of the condenser 94 and the resistor 96 is made sufficiently large so that only the beat frequency signal appears across the resistor 96. In other words, the signal which is developed across the resistor 96 is equal to the frequency difference in the output frequencies of the two resonators.

The beat frequency signal from the resistor 96 is applied to a conventional frequency meter circuit 98 which furnishes its output to a conventional indicator 100. In accordance with the explanation in the derivation of Equation 7, the frequency meter measures ΔF, and the indicator can be calibrated to indicate the mass flow rate of the sample gas component through the core of the second resonator at any instant. The frequency meter circuit and associated indicator then sense frequency difference variation with time and provide an indication which is represented by the curves on the graph shown in Fig. 2.

To integrate the beat frequency ΔF as a function of time, the beat frequency from the resistor 96 is applied through a conventional pulse shaper 102 to a conventional pulse counter 104. The pulse counter is preferably of the ordinary electronic decade type, and it has a terminal 106 for receiving a relatively large pulse which will reset the counter. A ground connection 107 is associated with the reset circuit in the counter.

If the counter were allowed to run freely, its final accumulated count would represent the combined area under the curves 74, 76 and 78 of Fig. 2 in accordance with the previous explanation of Equations 10 and 11. Therefore, if the weight of any particular component of the gas sample is to be ascertained, the counter should read out and re-set at some time between the occurrence of each pair of the curves of Fig. 2. Accordingly, a conventional recorder 108 is provided, and a relay circuit 110 is coupled to the frequency meter circuit 98 so that the relay circuit serves to transfer the counter reading from the counter to the recorder each time each one of the gas sample components finishes passing through the core of the second resonator. The relay circuit also serves to re-set the counter each time the reading from the counter is transferred to the recorder.

The relay circuit includes a first relay 112 having a winding 114 and an armature 116, and a second relay 118 having a winding 120 and first and second armatures 122, 124. The winding 114 of the first relay is coupled to the output of the frequency meter circuit 98 so that the winding is energized each time one of the successive curves shown in Fig. 2 begins to rise from zero. An alternating current source 126 is connected electrically in series with a resistor 128, a diode 130, the winding 120 of the second relay, and the armature 116 of the first relay. The armature of the first relay acts as a switch which closes when the winding 114 is de-energized and opens when the winding 114 is energized, and which by this action opens and closes the series circuit just described. A condenser 132 is connected across the series circuit, with one side of the condenser being connected at a point between the diode 130 and the winding 120 and the other side of the condenser being connected at a point between the armature 116 and the alternating current source 126.

A second condenser 134 is connected between one side of the alternating current source 126 and a circuit lead 136. A second resistor 138 and a second diode 140 are serially connected between the other side of the alternating current source 126 and the circuit lead 136. The circuit lead 136 is connected through the armature 124 of the second relay to the reset terminal 106 of the pulse counter 104. The armature 124 of the second relay acts as a switch which is normally closed and which opens when the winding 120 is energized. The other armature 122 of the second relay acts as a switch between the pulse counter and recorder which is normally open and which closes when the winding 120 is energized.

When one of the successive curves shown in Fig. 2 begins to rise from zero, the winding 114 of the first relay is energized by the output signal provided by the frequency meter, and the armature 116 opens. Therefore, the alternating current source 126 supplies alternating current through the resistor 128 and the diode 130 to build up a charge on the condenser 132. At this time the armature 122 is open and the pulse counter is counting pulses. Also at this time, no charge is building up on the second condenser 134 because it leaks off through the closed armature 124 to the pulse counter, and through the re-set circuit of the pulse counter to ground. The resistance 138 is sufficiently large to attenuate the alternating current signal so that it is not adequate to cause the pulse counter to reset.

When the beat frequency ΔF becomes zero again, the winding of the first relay will no longer be energized and its associated armature 116 will close, causing the charge accumulated on the condenser 132 to surge through the winding 120 of the second relay. By so energizing the winding of the second relay, the armature 122 closes causing the pulse counter reading to be transferred from the counter to the recorder, and the armature 124 opens so that a charge begins to build up on the condenser 134. This condition remains in effect for a transitory period determined by the time it takes all the charge to leak off the condenser 132 and by the characteristics of the relay 118, which may be a relay of the slow release type.

When this transitory period has ended and the winding 120 is no longer energized, the armature 122 opens the connection between the pulse counter and the recorder and the armature 124 closes, permitting the charge accumulated on the condenser 134 to surge to the re-set terminal of the pulse counter and cause the counter to re-set. When the next sample gas component begins to pass through the core of the second resonator and the next successive one of the curves shown in Fig. 2 begins to rise from zero, the entire cycle of events is repeated.

Referring now to Fig. 3, the apparatus shown therein is identical to that shown in Fig. 1 except that a gas component absorber 140 has been substituted for the gas chromatograph 14 and the conduit running between the first resonator and the gas absorber 140 is no longer provided with any branch inlet such as shown at 68 in Fig. 1. Accordingly, the apparatus of Fig. 3 includes a first resonator 142, a second resonator 144, means 146 responsive to the frequency outputs of the two resonators for providing a signal of frequency proportional to the difference in output frequencies of the resonators, a pulse shaper 148, a pulse counter 150, a recorder 152, a frequency meter circuit 154, an indicator 156 and a relay circuit 158.

Figure 4:
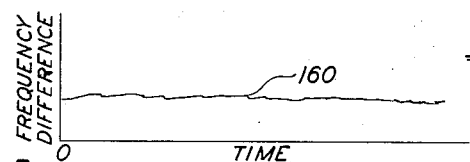
Fig. 4 is a graph of frequency difference as a function of time which depicts a use of the modified apparatus shown in Fig. 3.
Figure 5:
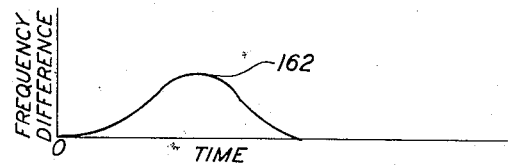
Fig. 5 is a graph of frequency difference as a function of time depicting a different use of the modified apparatus shown in Fig. 3.

Fig. 3 is to be taken with Figs. 4 and 5 to indicate other uses of the apparatus of the invention. For example, if the gas component absorber is a carbon dioxide absorber, air may be passed serially through the core of the first resonator, the gas absorber and the core of the second resonator and the gas absorber will continuously remove the carbon dioxide from the air. In this situation the frequency difference versus time curve 160 is shown in Fig. 4. The pulse counter reading at any time will indicate the amount of carbon dioxide that has been absorbed by the absorber up to that time. The frequency meter circuit and indicator will have a substantially constant output as shown by the curve 160 so long as air continues to pass through the system.

In the case of the use described above, it should be noted that a gas mixture, namely air, is passing through the core of the first resonator and that a gas mixture less one of its component gases, namely air less carbon dioxide, is passing through the core of the second resonator.

In accordance with Fig. 5, any specific unknown amount of gas may be mixed with a carrier gas by any desired means and passed through the apparatus of Fig. 3. In this instance the pulse counter will determine the amount or weight concentration of the gas component as represented by the area under the curve 126 shown in Fig. 5.

It should be noted in Fig. 3 that it is not necessary to have the outlet of the first resonator connected to the inlet of a gas separating device. Where quantitative accuracy is of secondary importance, it is entirely possible to pass the gas through the first resonator, using the outlet of the first resonator as an exhaust, and separately couple the inlet of the gas separating device to the supply of gas. The requirement is that a gas mixture pass through the core of one resonator and that a gas mixture less at least one of its component gases pass through the core of the second resonator at the same time.

Also it should be observed that it is not necessary to use the exact resonator structure shown in Figs. 1 and 3, so long as the resonator used performs substantially the same operation.

Although I prefer to effect the measurements by measuring the difference between the resonant frequencies of the two resonators, it will be apparent that the same result may be obtained by measuring the sum of the resonant frequencies.

I claim:

1. In apparatus for gas analysis including a gas chromatograph for separating component gases of a gas sample, the combination which comprises a first acoustic resonator having a hollow core for receiving gas and providing a frequency output dependent upon the nature of gas present in the core, a second acoustic resonator having a hollow core for receiving gas and providing a frequency output dependent upon the nature of gas present in the core, each of said resonator cores having an inlet and an outlet, means for passing a stream of carrier gas in series through the core of the first resonator, the chromatograph, and the core of the second resonator, means for introducing a gas sample into the stream at a point downstream from the first resonator so that the component gases of the sample are separated in the chromatograph and successively carried through the core of the second resonator, means responsive to the frequency outputs of the two resonators for providing a signal representative of the difference in output frequencies of the two resonators when said gases are passed through the resonator cores, and means responsive to said signal for providing quantitative measurements representative of the amounts of said gas components in the gas sample.

2. In apparatus for gas analysis including a gas chromatograph for separating component gases of a gas sample, the combination which comprises a first acoustic resonator having a hollow core for receiving gas and providing a frequency output dependent upon the nature of gas present in the core, a second acoustic resonator having a hollow core for receiving gas and providing a frequency output dependent upon the nature of gas present in the core, each of said resonator cores having an inlet and an outlet, means for passing a stream of carrier gas in series through the core of the first resonator, the chromatograph, and the core of the second resonator, means for introducing a gas sample into the stream at a point downstream from the first resonator so that the component gases of the sample are separated in the chromatograph and successively carried through the core of the second resonator, means responsive to the frequency outputs of the two resonators for providing a signal of frequency proportional to the difference in output frequencies of the two resonators, and means for integrating the frequency of said signal as a function of time.

3. In apparatus for gas analysis including a gas chromatograph for separating component gases of a gas sample, the combination which comprises a first acoustic resonator having a hollow core for receiving gas and providing a frequency output dependent upon the nature of gas present in the core, a second acoustic resonator having a hollow core for receiving gas and providing a frequency output dependent upon the nature of gas present in the core, each of said resonator cores having an inlet and an outlet, means for passing a stream of carrier gas in series through the core of the first resonator, the chromatograph, and the core of the second resonator, means for introducing a gas sample into the stream at a point downstream from the first resonator so that the component gases of the sample are separated in the chromatograph and successively carried through the core of the second resonator, means responsive to the frequency outputs of the two resonators for providing a signal of frequency proportional to the difference in output frequencies of the two resonators when said gases are passed through the resonator cores, counter means for accumulating a count of the cycles of said signal, and means for re-setting the counter means each time one of the gas sample components finishes passing through the core of the second resonator.

4. In apparatus for gas analysis including a gas chromatograph for separating component gases of a gas sample, the combination which comprises a first acoustic resonator having a hollow core for receiving gas and providing a frequency output dependent upon the nature of gas present in the core, a second acoustic resonator having a hollow core for receiving gas and providing a frequency output dependent upon the nature of gas present in the core, each of said resonator cores having an inlet and an outlet, means for passing a stream of carrier gas in series through the core of the first resonator, the chromatograph, and the core of the second resonator, means for introducing a gas sample into the stream at a point downstream from the first resonator so that the component gases of the sample are separated in the chromatograph and successively carried through the core of the second resonator, means responsive to the frequency outputs of the two resonators for providing a signal of frequency proportional to the difference in output frequencies of the two resonators when said gases are passed through the resonator cores, means for integrating the frequency of said signal as a function of time, means for recording the value of integration each time one of the gas sample components finishes passing through the core of the second resonator, and means for re-setting the integrating means each time the value of integration is recorded.

5. In apparatus for gas analysis including a gas chromatograph for separating component gases of a gas sample, the combination which comprises a first acoustic resonator having a hollow core for receiving gas and providing a frequency output dependent upon the nature of gas present in the core, a second acoustic resonator having a hollow core for receiving gas and providing a frequency output dependent upon the nature of gas present in the core, each of said resonator cores having an inlet and an outlet, means for passinng a stream of carrier gas in series through the core of the first resonator, the chromatograph, and the core of the second resonator, means for introducing a gas sample into the stream at a point downstream from the first resonator so that the component gases of the sample are separated in the chromatograph and successively carried through the core of the second resonator, an electrical circuit coupled to the resonators for producing a beat frequency equal to the difference in output frequencies of the resonators when said gases are passed through the resonator cores, a counter coupled to the electrical circuit for accumulating a count of the cycles of the beat frequency, a frequency meter coupled to the electrical circuit for measuring the beat frequency, a recorder, relay means coupled to the frequency meter for transferring the counter reading from the counter to the recorder each time one of the gas sample components finishes passing through the core of the second resonator, and for re-setting the counter each time the reading from the counter is transferred to the recorder, and means for maintaining the gas in both resonator cores at substantially the same temperature.

6. Apparatus of claim 5 wherein the means for maintaining the gas in both resonator cores at substantially the same temperature comprises a body of heat conducting material which surrounds the cores of both resonators, and means for passing the gas entering into each core through circuitous paths intimate with the heat conducting material before the gas enters into the cores.

References Cited in the file of this patent

UNITED STATES PATENTS

| | | |
|---|---|---|
| 2,521,041 | Chase | Sept. 5, 1950 |
| 2,633,737 | Richardson | Apr. 7, 1953 |
| 2,775,885 | Rassweiler et al. | Jan. 1, 1957 |

FOREIGN PATENTS

| | | |
|---|---|---|
| 574,819 | Great Britain | Jan. 22, 1946 |
| 727,891 | Great Britain | Apr. 13, 1955 |
| 825,177 | Germany | Dec. 17, 1951 |

OTHER REFERENCES

Article: "Gas Chromatography," by N. H. Ray, I, II in Journal Applied Chemistry, vol. 4, pages 21, 82, February 1954.